United States Patent [19]

Takano et al.

[11] Patent Number: 4,687,425
[45] Date of Patent: Aug. 18, 1987

[54] FUEL INJECTION PUMP HAVING SINTERED CAM RING SECURED TO BODY BY BOLT

[75] Inventors: Yoshiya Takano, Katsuta; Yoshikazu Hoshi, Toukai; Takao Abe, Hitachi; Ryozoo Tomozaki, Mito, all of Japan

[73] Assignee: Hitachi, Ltd., Tokyo, Japan

[21] Appl. No.: 635,152

[22] Filed: Jul. 27, 1984

[30] Foreign Application Priority Data

Aug. 3, 1983 [JP] Japan .................................. 58-141072

[51] Int. Cl.$^4$ ............................................ F04B 19/02
[52] U.S. Cl. .................................. 417/462; 123/450; 74/567; 403/331; 403/381
[58] Field of Search .................... 417/462; 123/450; 74/55, 567; 403/331, 381, 388, 408.1

[56] References Cited

U.S. PATENT DOCUMENTS

| 3,204,561 | 9/1965 | Roosa | 417/462 |
| 3,425,428 | 2/1969 | Schwartz | 403/331 X |
| 4,021,991 | 5/1977 | Hotz | 403/388 |

FOREIGN PATENT DOCUMENTS

| 629757 | 9/1949 | United Kingdom | 403/408.1 |
| 804026 | 11/1958 | United Kingdom | 123/450 |
| 857970 | 1/1961 | United Kingdom | 123/450 |

OTHER PUBLICATIONS

SAE Technical Paper Series, "Production of Full-Density MZ Automotive Diesel Parts Via the HTM TM Powder Metal Process," Feb. 25–29, 1980.

Primary Examiner—Carlton R. Croyle
Assistant Examiner—Paul F. Neils
Attorney, Agent, or Firm—Antonelli, Terry & Wands

[57] ABSTRACT

A sintered cam ring is secured to the inner surface of a cylindrical body by means of a bolt. A fuel injection pump has a rotor which supports a roller rotating along the inner surface of the sintered cam ring and is driven by an engine. The sintered cam ring is provided in the outer surface thereof with a groove extending along the central axis thereof. A positioning member for fixing the position of the groove and that of a pin hole formed in the body for receiving a bolt is inserted such as to stretch between the groove and the pin hole. Further, a bolt is employed to secure and tighten the positioning member fitted in both the pin hole and the groove from the outside of the body.

6 Claims, 7 Drawing Figures

FUEL INJECTION PUMP HAVING SINTERED CAM RING SECURED TO BODY BY BOLT

BACKGROUND OF THE INVENTION

The present invention relates to a fuel injection pump and, more particularly, to a sintered cam ring for a fuel injection pump. Furthermore, the present invention pertains particularly to a sintered cam ring for a fuel injection pump which has a rotor rotating therein and is secured at the outer portion thereof to a body by means of a bolt.

Examples of the fuel injection pump having a cam ring in which a rotor rotates inside the body thereof include "Distributor Type Fuel Injection Pump" (Japanese Patent Laid-Open No. 35,260/1983) laid open on Mar. 1, 1983. As the sintered cam ring used as the cam ring for a fuel injection pump, an example has been introduced in which a through hole and a screw are provided on a sintered cam ring from the outer periphery to the inner periphery thereof after the cam ring has been subjected to annealing, the example being shown in FIG. 3 and mentioned in the description taken in conjunction therewith in a paper under the title "Production of Full-Density M2 Automotive Diesel Parts via the HTM TM Powder Metal Process", collected in "SAE Technical Paper Series 800,309", proposed by John A. Rassenfoss at the 75th anniversary of the Society of Automotive Engineers, Inc. held at the Congress and Exposition Cobo Hall in Detroit, U.S.A. from 25 to 29 of February, 1980.

The thus constructed sintered cam ring is positioned and secured to the body thereof in such a manner that the sintered cam ring is subjected to thread cutting in the radial direction thereof and is secured to the body in a lateral direction. Such positioning and securing of the sintered cam ring encounters the following disadvantages:

In sintering a cam ring with a preparatory hole opened therein, the sintering temperature exceeds 1,200° C., so that the sintered cam ring reaches a high degree of hardness. Therefore, a thread for screwing a bolt for securing the sintered cam ring to the body cannot be cut in the preparatory hole of the sintered cam ring unless this high degree of hardness is properly lowered. For this reason, it is conventional practice to conduct thread cutting after carrying out annealing and then to effect quenching above 1,200° C. in order to obtain a necessary strength.

Thus, the conventional sintered cam ring inconveniently requires carrying out annealing for cutting a thread in the preparatory hole, as well as quenching and tempering after sintering the cam ring, and therefore disadvantageously needs a large number of steps in positioning and securing the sintered cam ring to the body thereof.

SUMMARY OF THE INVENTION

Accordingly, it is a primary object of the present invention to provide a fuel injection pump having a sintered cam ring which is easily positioned and secured to the body thereof.

To this end, according to the invention, a groove is provided which is formed in the outer surface of a sintered cam ring along the central axis thereof, and a positioning member for fixing the position of the groove and that of a pin hole for receiving a bolt is inserted such as to stretch between the groove and the pin hole, and further a bolt is employed to secure and tighten the positioning member fitted in the groove and the pin hole from the outside of the body.

According to the present invention, it is possible to omit the conventionally required annealing process for cutting a thread in the sintered cam ring; therefore, it is possible to facilitate the positioning and securing of the sintered cam ring to the body.

DETAILED DESCRIPTION OF THE PREFERRED EMBODIMENTS

Figure 1:
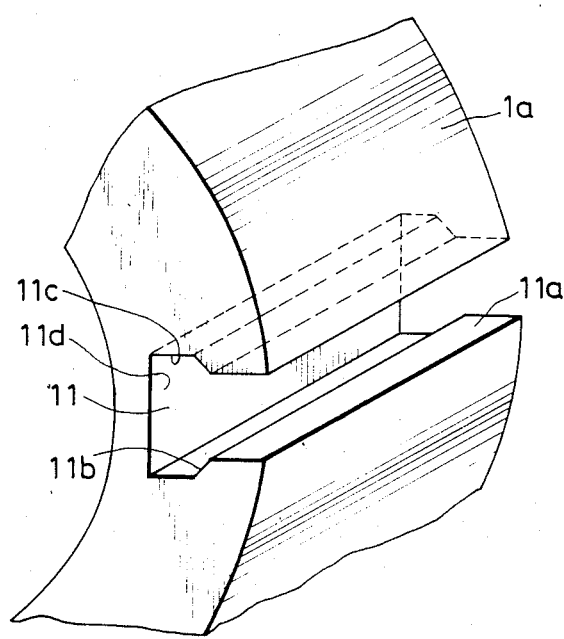
FIG. 1 is a perspective view of a sintered cam ring in one embodiment of the fuel injection pump in accordance with the present invention.
Figure 2:
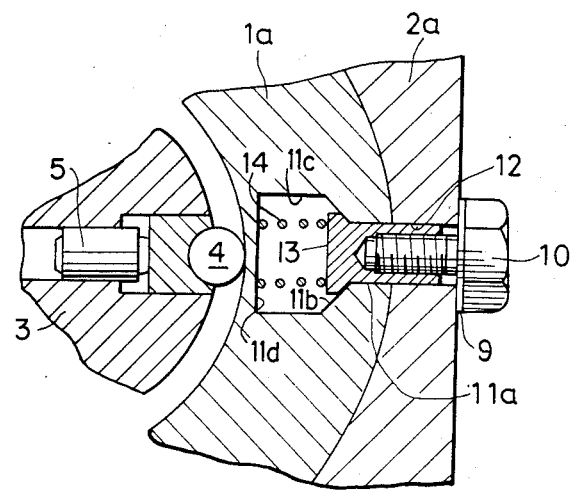
FIG. 2 is a sectional view showing one example of mounting the sintered cam ring shown in FIG. 1 to the body.

Referring first to FIGS. 1 and 2, a sintered cam ring 1a is provided in the outer wall surface thereof with a groove 11 extending in the axial direction thereof. A pin hole 12 is provided in the inner wall surface of a body 2a at a portion thereof corresponding to a bore for receiving a bolt 10. A stopper pin or positioning member 13 is inserted in the pin hole 12 and the groove 11 such as to stretch between both of them and is tightened by means of the bolt 10. By so doing, it becomes easy to position and secure the sintered cam ring 1a to the body 2a, and it is possible to obtain the sintered cam ring 1a for a fuel injection pump which is easily positioned and secured to the body 2a.

More specifically, the axial groove 11 is provided in an outer wall surface portion of the sintered cam ring 1a which opposes the bolt 10. The groove 11 is constituted by two surfaces 11c which are parallel to the pin hole 12, a surface 11d which is parallel to the outer wall surface of the sintered cam ring 1a, the pin hole 12 (a positioning portion 11a) which is on the same axis as that of the surface 11d parallel to the outer wall surface and is smaller in area than the surface 11d, and a slanted surface (securing portion) 11b which connects the surface 11c parallel to the inner wall surface of the pin hole 12 and the positioning portion 11a, thereby to define a hollow part such that the distance between the surfaces 11c is larger than the shortest distance between the surface 11d and the opposing slanted surface 11b. The body 2a is fitted on the outer periphery of the sintered cam ring 1a provided with the groove 11 in the axial direction thereof and is aligned with the sintered cam ring 1a such that the stopper pin 13 can be fitted in both the groove 11 and the pin hole 12 which is provided in the inner wall surface of the body 2a and at a portion corresponding to the bore for receiving the bolt 10. After the body 2a and the sintered cam ring 1a are properly aligned, the stopper pin 13 is inserted into the groove 11 in the axial direction of the sintered cam ring 1a through a spring 14. Thus, when reaching the position where the groove 11 and the pin hole 12 are aligned with each other, the stopper pin 13 is projected into the pin hole 12 by the force of the spring 14 such as to stretch between the groove 11 and the pin hole 12. In this case, the sintered cam ring 1a and the body 2a are positioned and secured to each other by means of the stopper pin 13 held by the positioning portion 11a and the securing portion 11b provided in the sintered cam ring 1a. More specifically, the stopper pin 13 is fixedly positioned by the flange portion of the stopper pin 13 inserted into the positioning portion 11a of the groove 11 and is secured in the groove 11 by the engagement between the slanted securing portion 11b of the groove 11 and the flange portion of the stopper pin 13. After the sintered cam ring 1a and the body 2a have been thus positioned and secured to each other by means of the stopper pin 13, the stopper pin 13 having a threaded inner wall portion is tightened by the bolt 10. As a result, the sintered cam ring 1a and the body 2a are firmly secured to each other.

The sintered cam ring 1a and the body 2a are thus positioned and secured to each other. The positioning portion 11a which requires grinding in order to ensure an appropriate accuracy is easily machined, since the positioning portion 11a is subjected to double-surface machining, which is easily effected, and it is possible to machine the positioning portion 11a in a state of high hardness after the completion of sintering.

Referring to FIG. 2, a rotor 3 supports a pair of rollers 4 and a pair of pistons 5 rotating along the inner surface of the cam ring 1a as taught by a conventional rotating distributor fuel injection pump.

Figure 3:
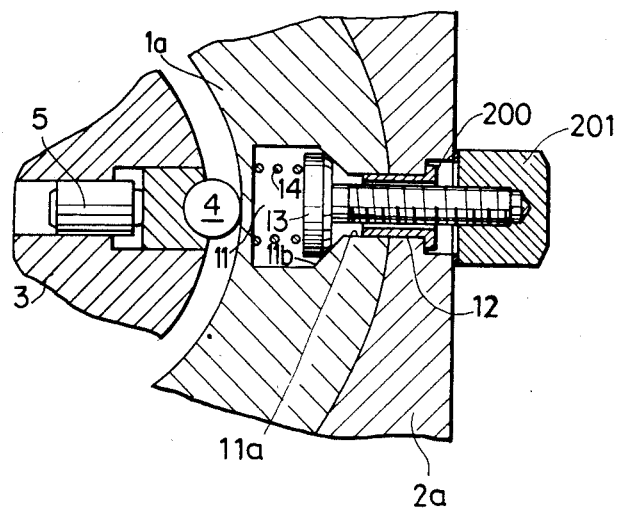
FIG. 3 is a sectional view showing another example of mounting the sintered cam ring shown in FIG. 1 to the body.

Referring to FIGS. 1 and 3, the body 2a and the sintered cam ring 1a are positioned in such a manner that a positioning member 11a, which has at one end thereof a collar 200 coming in contact with a step portion provided in the body 2a and has a threaded inner surface, is inserted such as to stretch between the groove 11 and the pin hole 12. On the other hand, the body 2a and the sintered cam ring 1a are secured to each other by screwing the positioning member 11a on the threaded portion of the stopper pin 13 having a flange portion and turning a box nut outside the body 2a. It is to be noted that the stopper pin 13 is pressed by the spring 14 toward the right-hand side as viewed in FIG. 3. A force in the rightward direction as viewed in FIG. 3 is applied to the stopper pin 13 by means of the collar 200 and the turning of the box nut 201 and is received by the flange portion of the stopper pin 13 at the securing portion 11b of the sintered cam ring 1a, thereby to firmly secure the stopper pin 13.

Figure 4:
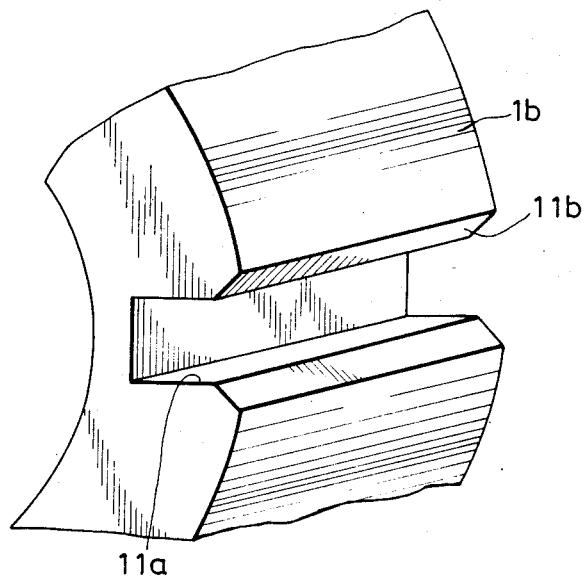
FIG. 4 is a perspective view of a sintered cam ring in another embodiment of the fuel injection pump in accordance with the present invention.
Figure 5:
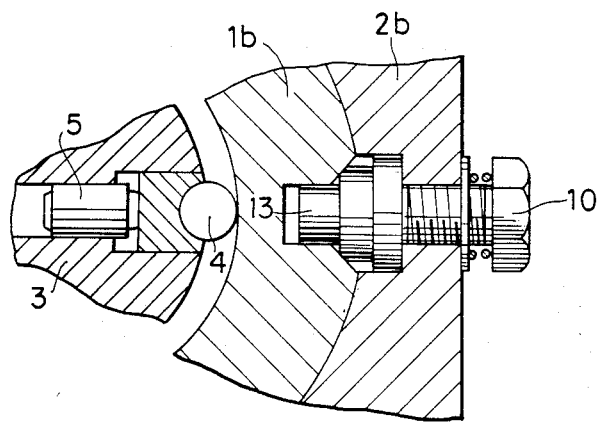
FIG. 5 is a sectional view showing one example of mounting the sintered cam ring shown in FIG. 4 to the body.

Referring next to FIGS. 4 and 5, the sintered cam ring 1b is provided in the outer wall surface thereof with a groove 11 extending in the axial direction thereof. The groove 11 has a securing portion 11b constituted by slanted surfaces which are formed closer to the outer wall surface of the sintered cam ring 1b and a positioning portion 11a constituted by two parallel surfaces which are formed closer to the inner wall surface of the sintered cam ring 1b. Also in this case, the positioning portion 11a which requires grinding in order to ensure a necessary accuracy can be easily machined after the completion of sintering the cam ring 1b, since the positioning portion 11a is subjected to double-surface machining, which is easily effected. Thus, an advantageous effect similar to that described above can be offered. In this case, the stopper pin 13 is fitted in the body 2b, and the body 2b fitted with the stopper pin 13 is axially fitted on the sintered cam ring 1b with the end portion of the stopper pin 13 inserted in the positioning portion 11a of the groove 11 of the sintered cam ring 1b and the flange portion of the stopper pin 13 abutting against the securing portion 11b of the groove 11. After the body 2b has reached a predetermined fixing position, the pin 13 is tightened by means of the bolt 10, thereby to secure the sintered cam ring 1b and the body 2b. This embodiment advantageously simplifies the cross-sectional configuration of the groove 11 of the sintered cam ring 1b and therefore facilitates molding of the sintered cam ring 1a.

Figure 6:
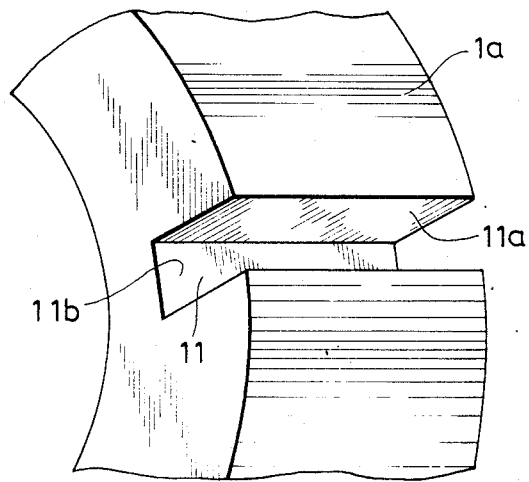
FIG. 6 is a perspective view of a sintered cam ring in still another embodiment of the fuel injection pump in accordance with the present invention.
Figure 7:
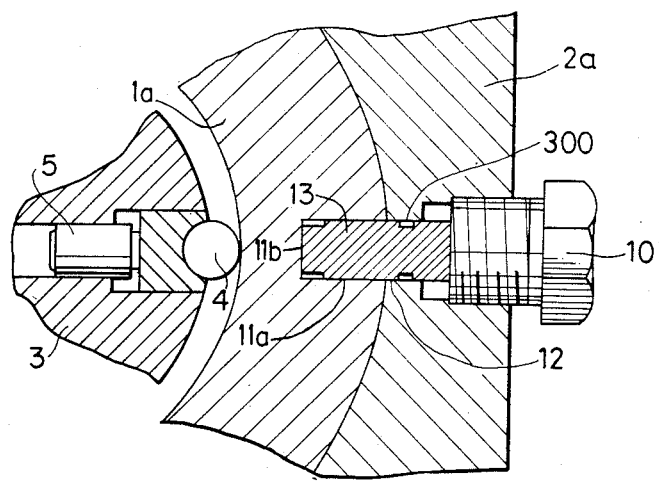
FIG. 7 is a sectional view showing one example of mounting the sintered cam ring shown in FIG. 6 to the body.

Referring next to FIGS. 6 and 7, the sintered cam ring 1a is provided with a groove 11 extending in the axial direction thereof. The groove has side surfaces 11a which are employed as a positioning portion. A bottom surface 11b of the groove 11 is employed as a securing portion for the stopper pin 13.

The sintered cam ring 1a and the body 2a are positioned relative to each other by guiding the positioning portion 11a of the sintered cam ring 1a and the pin hole 12 of the body 2a by means of the stopper pin 13. Further, the stopper pin 13 is provided with an O-ring 300 which serves as a seal for preventing leakage of fuel from the inside of the body 2a. On the other hand, the sintered cam ring 1a is secured to the body 2a in such a manner that the stopper pin 13 is pressed by means of the bolt 10 toward the left-hand side as viewed in FIG. 7, and the pressing force is received by the securing portion 11b constituted by the groove bottom surface of the sintered cam ring 1a. This embodiment advantageously simplifies the cross-sectional configuration of the groove 11 and therefore facilitates molding of the sintered cam ring 1a.

In each of the above-described embodiments, the groove 11 of the sintered cam ring 1a is formed in the axial direction thereof when the sintered cam ring is pressure-molded. Therefore, it advantageously becomes easy to mold the sintered cam ring.

What is claimed is:

1. In a fuel injection pump having a sintered cam ring secured to the inner surface of a cylindrical body, and a rotor which supports a pair of rollers and a pair of pistons rotating along the inner surface of said cam ring and is driven by an engine, the improvement comprising said cylindrical body having a pin hole opened at a portion of said body where a bolt is received; said sintered cam ring having a groove formed in the outer surface thereof along the central axis of said cam ring such as to oppose said pin hole in said cylindrical body, said groove being formed along the axial direction of the sintered cam ring when said sintered cam ring is pressure-molded before the sintering of the cam ring;

a positioning member inserted such as to stretch between said groove and said pin hole; and said bolt for tightening said sintered cam ring and said body from the outer surface of said body through said positioning member which is secured in both said pin hole and groove.

2. A fuel injection pump according to claim 1, wherein said groove has a slanted portion formed at an opening portion thereof closer to said pin hole, and said positioning member has a flange portion coming in contact with said slanted portion, and further said bolt engages with said body so as to tighten said positioning member.

3. A fuel injection pump according to claim 1, wherein said groove has a slanted portion formed at an opening portion thereof closer to said pin hole, and said positioning member has a thread groove cut in the inner peripheral surface thereof and is provided on the outer peripheral surface thereof with a flange portion coming in contact with said slanted portion, and further said bolt engages with said thread groove provided on the inner peripheral surface of said positioning member so as to tighten said positioning member.

4. A fuel injection pump according to claim 1, wherein said groove has a slanted portion formed at an opening portion thereof closer to said pin hole, and said positioning member has a collar engaging with a step portion of said body and a thread groove cut in the inner peripheral surface thereof, and further said bolt has a flange portion coming in contact with the slanted portion of said groove and engages with the thread groove of said positioning member as well as being tightened by means of a nut outside said pin hole.

5. A fuel injection pump according to claim 1, wherein said positioning member has one end portion coming in contact with the bottom portion of said groove, and said bolt tightens the other end portion of said positioning member toward the bottom portion of said groove.

6. A fuel injection pump according to claim 1, wherein a spring is interposed between the bottom portion of said groove and said positioning member.

* * * * *